(12) United States Patent
Asada (10) Patent No.: US 9,971,029 B2
(45) Date of Patent: May 15, 2018

(54) RADAR APPARATUS (71) Applicant: Furuno Electric Co., Ltd., Nishinomiya (JP)

(72) Inventor: Yasunobu Asada, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 371 days.

(21) Appl. No.: 14/774,111

(22) PCT Filed: Mar. 11, 2014

(86) PCT No.: PCT/JP2014/056237
§ 371 (c)(1),
(2) Date: Sep. 9, 2015

(87) PCT Pub. No.: WO2014/142088
PCT Pub. Date: Sep. 18, 2014

(65) Prior Publication Data
US 2016/0018513 A1    Jan. 21, 2016

(30) Foreign Application Priority Data
Mar. 12, 2013  (JP) ................................. 2013-048844

(51) Int. Cl.
*G01S 13/89*    (2006.01)
*G01S 13/42*    (2006.01)
(Continued)

(52) U.S. Cl.
CPC ............. *G01S 13/89* (2013.01); *G01S 7/285* (2013.01); *G01S 13/42* (2013.01); *G01S 13/426* (2013.01); *G01S 7/16* (2013.01); *G01S 13/9307* (2013.01)

(58) Field of Classification Search
CPC ............. G01S 7/04–7/24; G01S 13/89; G01S 13/426–13/428; G01S 13/42; G01S 7/285; G01S 13/9307; G01S 7/16
See application file for complete search history.

(56) References Cited

U.S. PATENT DOCUMENTS

2003/0117311 A1    6/2003  Funai

FOREIGN PATENT DOCUMENTS

DE    10228583 A1    7/2003
JP    08271612 A    10/1996
(Continued)

OTHER PUBLICATIONS

ISA Japanese Patent Office, International Search Report Issued in Application No. PCT/JP2014/056237, dated Jun. 17, 2014, WIPO, 4 pages.

*Primary Examiner* — Matthew M Barker
(74) *Attorney, Agent, or Firm* — Alleman Hall Creasman & Tuttle LLP (57) ABSTRACT

A radar apparatus is provided, which can enhance resolution by data processing. The radar apparatus includes a radar wave transmitter, a radar wave receiver, and an analyzing module. The analyzing module analyzes data received by the radar wave receiver, stores amplitude data and speed data of a target object for every cell in a predetermined coordinate system, and processes, based on the data, the amplitude data of an observing cell in the predetermined coordinate system associated with speed. The analyzing module determines whether an absolute value of a speed difference between adjacent cells and adjacent to the observing cell while the observing cell is located therebetween, is a threshold or higher, and the analyzing module performs processing of reducing the amplitude of the observing cell if the absolute value is the threshold or higher.

16 Claims, 11 Drawing Sheets

(51) Int. Cl.
  *G01S 7/285* (2006.01)
  *G01S 7/16* (2006.01)
  *G01S 13/93* (2006.01)

(56) References Cited

FOREIGN PATENT DOCUMENTS

| JP | 10068771 A | 3/1998 |
| JP | 2003194924 A | 7/2003 |
| JP | 2007240412 A | 9/2007 |
| JP | 2008275502 A | 11/2008 |

FIG. 12

RADAR APPARATUS

TECHNICAL FIELD

This disclosure relates to a radar apparatus to be installed in a ship, etc.

BACKGROUND ART

For a radar apparatus installed in a ship, etc., it is important to enhance resolution for visibility, target-tracking, etc. The resolution can be enhanced in terms of azimuth direction and distance direction. For the azimuth direction, there is a method of narrowing a beam width by increasing the size of an antenna or the frequency of a radar transmission wave, etc. For the distance direction, there is a method of narrowing a pulse width by widening a bandwidth of the radar transmission wave (e.g., refer to Patent Document 1).

REFERENCE DOCUMENT OF CONVENTIONAL ART

Patent Document

Patent Document 1: JP1998-068771A

DISCLOSURE OF THE INVENTION

Problems to be Solved by the Invention

However, if the size of the antenna is increased, the kinds of ship in which the antenna can be installed are limited and also the costs are increased. Further, there is a limit in increasing the frequency and widening the bandwidth since the available frequency bandwidth is determined by the Radio Act.

Therefore, in view of the above situations, this disclosure aims to provide a radar apparatus which can enhance the resolution by data processing.

SUMMARY OF THE INVENTION

A radar apparatus of this disclosure includes a radar wave transmitter, a radar wave receiver, an analyzing module, and a radar display data output unit.

The analyzing module analyzes data of the radar waves received by the radar wave receiver, stores one of a pair of amplitude data and speed data of a target object and a pair of the amplitude data and acceleration data of the target object for every cell of a predetermined coordinate system, and processes, based on the pair of stored data, the amplitude data of an observing cell of the predetermined coordinate system associated with one of speed and acceleration.

Specifically, the analyzing module determines whether an absolute value of one of a speed difference and an acceleration difference between adjacent cells to the observing cell is one of a threshold and a value thereabove, and the analyzing module performs processing of reducing a value of the amplitude data of the observing cell if the absolute value is one of the threshold and a value thereabove, the adjacent cells having the observing cell therebetween.

In the processing, by processing an image data (reception data) without increasing the size of an antenna, and increasing a frequency and widening a bandwidth of a radar transmission wave, a plurality of adjacent target objects can be separated from each other. Therefore, the processing is applicable to any system regardless of the scale of the system. Moreover, the processing is applicable without restriction by law regulations, such as the Radio Act.

EFFECTS OF THE INVENTION

The radar apparatus according to this disclosure can enhance resolution without increasing the scale of a system.

MODES FOR CARRYING OUT THE INVENTION

Hereinafter, radar apparatuses according to some embodiments of this disclosure are described in detail with reference to the appended drawings.

First, a first embodiment of this disclosure is described.

Figure 1:
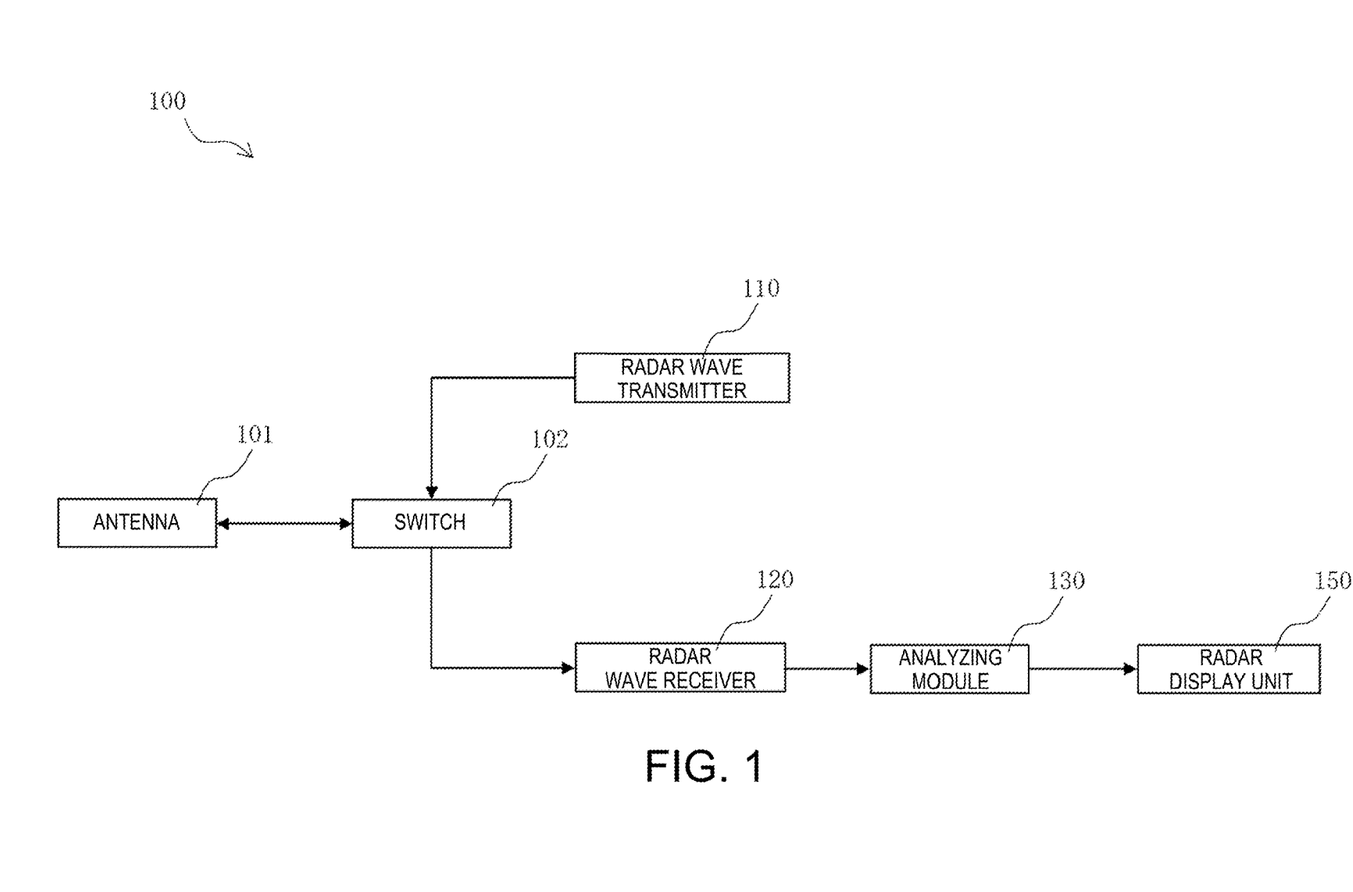
FIG. 1 is a block diagram illustrating a substantial configuration of a radar apparatus according to a first embodiment of this disclosure.

FIG. 1 is a block diagram illustrating a substantial configuration of a radar apparatus.

The radar apparatus 100 includes an antenna 101, a switch 102, a radar wave transmitter (hereinafter, referred to as the "transmitter") 110, a radar wave receiver (hereinafter, referred to as the "receiver") 120, an analyzing module 130, and a radar display unit 150. The radar apparatus including these components has a known, general configuration.

The antenna 101 is connected, by the switch 102 to be sequentially switchable, with the transmitter 110 having a radar wave transmitting function to transmit a radar wave at a predetermined time interval, and the receiver 120 having a radar wave receiving function to receive the radar wave reflected on a target object.

The analyzing module 130 is connected with the receiver 120. The analyzing module 130 analyzes reception data of the radar wave received by the receiver 120, and stores amplitude data and speed data of the target object for every cell of predetermined coordinate systems of different memories, respectively. Based on the data, the analyzing module 130 processes the amplitude data of an observing cell in the coordinate system associated with the speed data.

The analyzing module 130 is connected with the radar display unit 150. The radar display unit 150 displays, as radar display data, the amplitude data processed by the analyzing module 130 on a monitor screen. Note that, the receiver 120 includes a reception buffer configured to temporarily store the data received through the antenna 101 for a predetermined period of time in a single scan. The reception buffer may be provided to the analyzing module 130.

Figure 2:
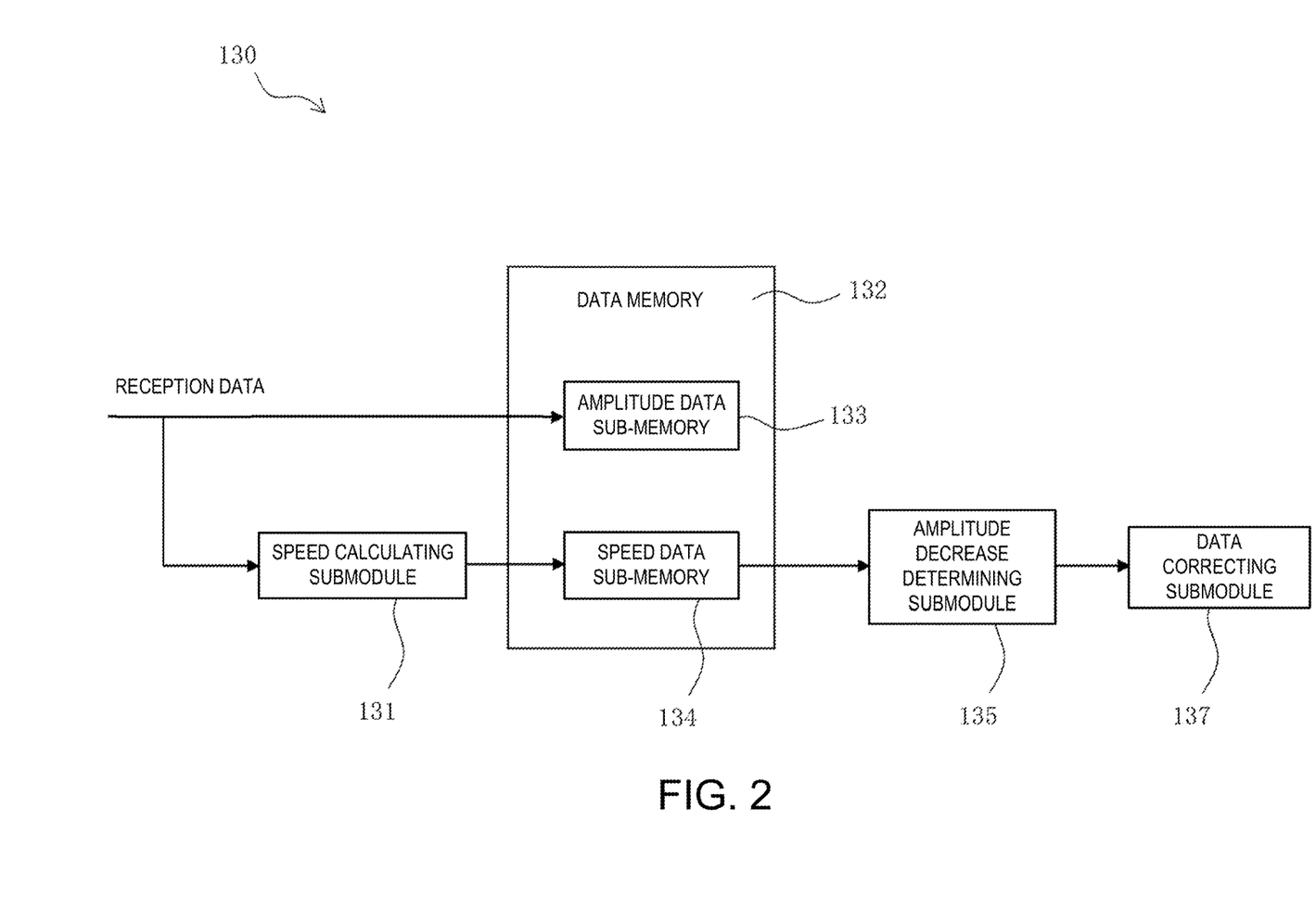
FIG. 2 is a block diagram illustrating a specific configuration of an analyzing module according to the first embodiment of this disclosure.
Figure 3:
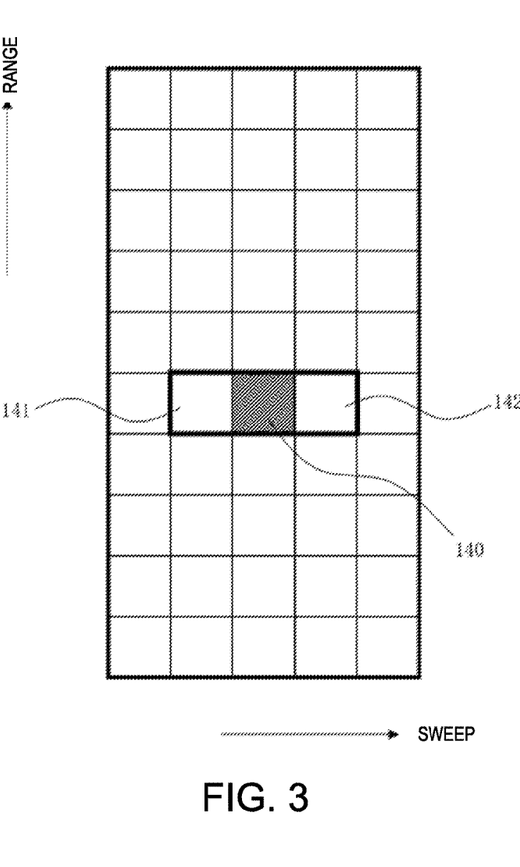
FIG. 3 is a view illustrating an observing cell and adjacent cells in a coordinate system according to the first embodiment of this disclosure.

FIG. 2 is a block diagram illustrating a specific configuration of the analyzing module. FIG. 3 is a view illustrating an observing cell and adjacent cells in the coordinate system of one of the memories. Here, a unit pixel is referred to a cell.

The analyzing module 130 includes a speed calculating submodule 131, a data memory 132, an amplitude decrease determining submodule 135, and a data correcting submodule 137.

The speed calculating submodule 131 is connected with the reception buffer of the receiver 120. The speed calculating submodule 131 calculates the speed data of the target object by analyzing the data received by the receiver 120 (echo data of radar wave). As the calculating method of the speed data, an algorithm using fast Fourier transform, or a pulse-pair method can be given, for example.

The data memory 132 includes an amplitude data sub-memory 133 and a speed data sub-memory 134. The coordinate system illustrated in FIG. 3 is designed in each sub-memory. The amplitude data sub-memory 133 is connected with the receiver 120. The amplitude data sub-memory 133 stores the amplitude element of the data received by the receiver 120, for every storage cell (hereinafter, referred to as the "cell"). The speed data sub-memory 134 is connected with the speed calculating submodule 131. The speed data sub-memory 134 stores the speed data calculated by the speed calculating submodule 131, for every storage cell (hereinafter, referred to as the "cell"). The cells of the amplitude data sub-memory 133 are in association with the cells of the speed data sub-memory 134 in terms of the coordinate position, respectively. Note that, in this embodiment, both of the coordinate systems designed in the amplitude and speed data sub-memories 133 and 134 have an X-axis indicating sweep angle and a Y-axis indicating distance.

The amplitude decrease determining submodule 135 is connected with the speed data sub-memory 134. The amplitude decrease determining submodule 135 determines whether an absolute value of a speed difference between adjacent cells 141 and 142 adjacent to an observing cell 140 while the observing cell 140 is located therebetween in the speed data sub-memory 134, is a threshold or higher. Note that, although the adjacent cells 141 and 142 are immediately adjacent to the observing cell 140 as illustrated in the drawing, two data sets for the same number of aligned cells in opposite directions respectively from the observing cell 140 may be averaged and handled as data of virtual cells respectively. Then, such averaged speed data of both virtual cells are replaced with the speed data in the adjacent cells 141 and 142 respectively, and the amplitude decrease determining submodule 135 determines whether an absolute value of the averaged speed data difference between both virtual cells is a threshold or higher.

The data correcting submodule 137 is connected with the amplitude decrease determining submodule 135. Based on the determination result obtained at the amplitude decrease determining submodule 135, if the absolute value of the speed difference between the adjacent cells 141 and 142 is the threshold or higher, the data correcting submodule 137 performs processing of reducing the amplitude of the observing cell 140 in the amplitude data sub-memory 133. In this case, the resolution is generally enhanced more as the reduced amount of the amplitude of the observing cell 140 is larger. In the following description, the processing of reducing the amplitude of the observing cell 140 corresponds to processing of adjusting the amplitude of the observing cell 140 to zero.

Figure 4:
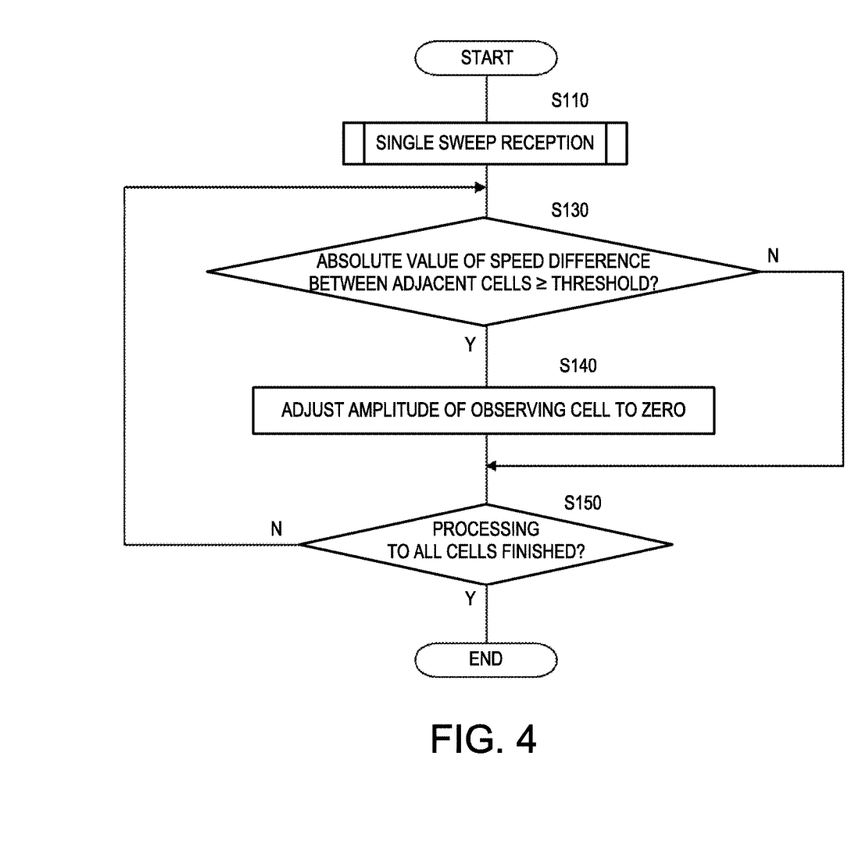
FIG. 4 is a flowchart illustrating contents of processing of a controller provided to the radar apparatus according to the first embodiment of this disclosure.

FIG. 4 is a flowchart illustrating contents of processing of a controller provided to the radar apparatus. Note that, in each drawing, the controller is omitted.

Once a single sweep worth or an appropriate amount of the radar waves transmitted from the transmitter 110 are received (S110), the controller processes the reception data reflected on the target object (echo data). Specifically, from the reception data, the analyzing module 130 specifies the amplitude data for each cell and stores them in the amplitude data sub-memory 133, and the analyzing module 130 specifies the speed data for each cell and stores them in the speed data sub-memory 134. Then, the analyzing module 130 performs the following analyzation and processing on these kinds of data.

The controller obtains the speed difference between the adjacent cells 141 and 142 for each observing cell 140 by referring to the speed data sub-memory 134. Then, if the absolute value of the speed difference is the threshold or higher (S130), the controller performs the processing of adjusting the amplitude of the observing cell 140 in the amplitude data sub-memory 133 to zero (S140). The controller performs this processing to all the cells while shifting the observing cell 140 (S150).

Figure 5:
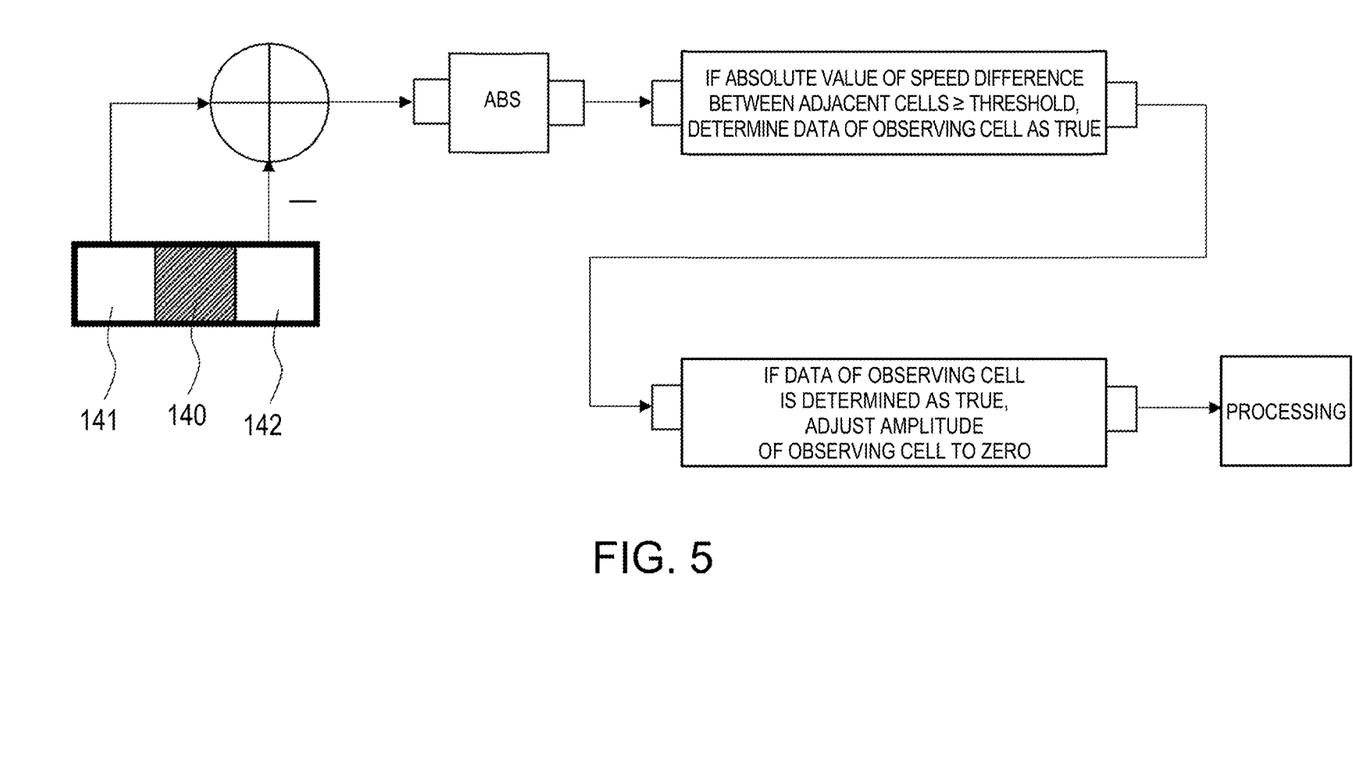
FIG. 5 is a block diagram illustrating specific contents of processing of the analyzing module according to the first embodiment of this disclosure.

FIG. 5 is a block diagram illustrating specific contents of processing of the analyzing module.

First, the analyzing module 130 calculates the speed difference between the adjacent cells 141 and 142 adjacent to the observing cell 140, by referring to the speed data sub-memory 134. Next, the analyzing module 130 calculates the absolute value of the speed difference, and if the absolute value of the speed difference between the adjacent cells 141 and 142 is the threshold or higher, the analyzing module 130 determines the data of the observing cell 140 as TRUE. This processing is repeated to cover all the cells, and then the analyzing module 130 performs the processing of adjusting the amplitude of the observing cell 140 of which data is determined as TRUE, to zero.

The physical significance in performing the above processing is as follows.

Specifically, if the speed difference between the cells adjacent to the observing cell is above a certain value (threshold) or higher, a possibility of the respective adjacent cells indicating different target objects becomes high. Thus, in this case, it is effective, in enhancing the resolution, to adjust the amplitude of the observing cell to zero and separate the respective adjacent cells in the amplitude data sub-memory 133 (separate in display data).

In the processing of this embodiment, a plurality of adjacent target objects can be separated from each other in the display data without increasing the size of the antenna 101, and increasing the frequency and widening the bandwidth of the radar transmission wave. Since the processing described above can be performed in data processing, it is applicable to any system regardless of scale thereof. Moreover, the processing described above is applicable without restriction by law regulations, such as the Radio Act.

Next, a second embodiment of this disclosure is described. Note that, in respective embodiments described hereinafter, the corresponding contents described in the first embodiment are suitably omitted.

Figure 6:
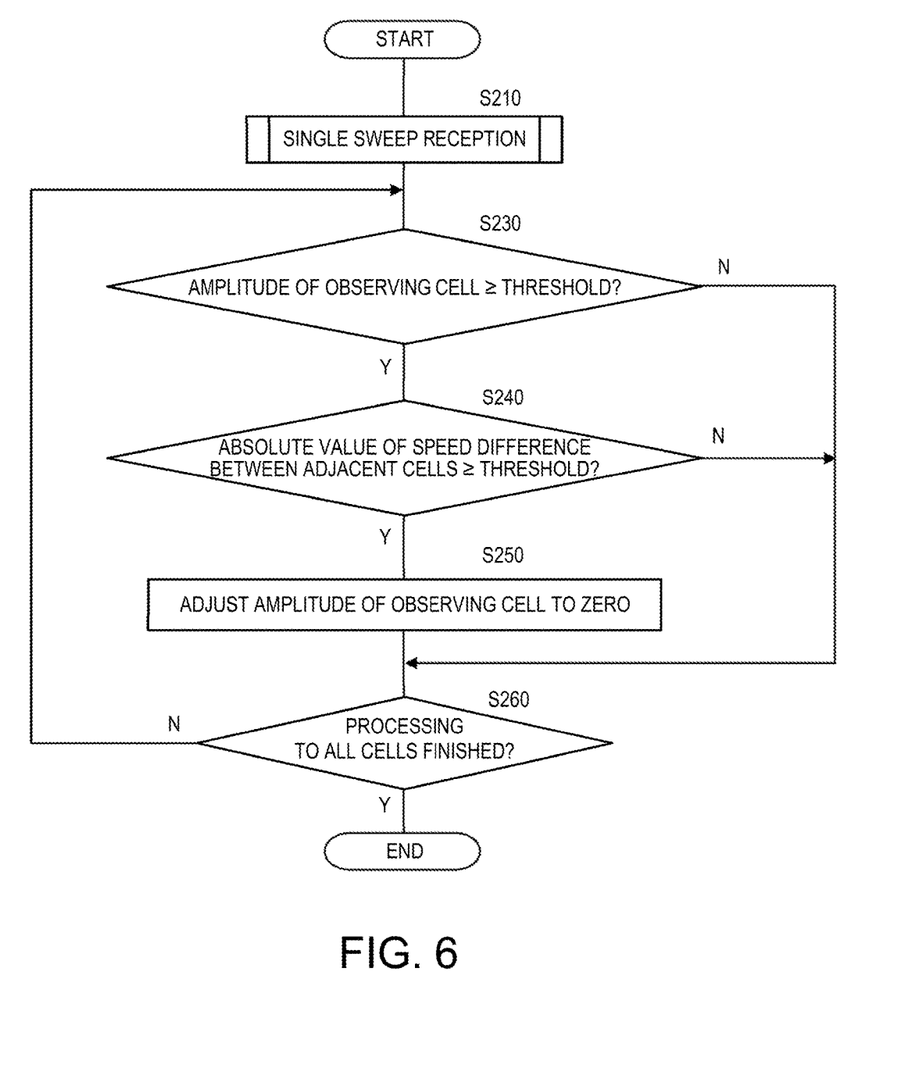
FIG. 6 is a flowchart illustrating contents of processing of a controller provided to a radar apparatus according to a second embodiment of this disclosure.

FIG. 6 is a flowchart illustrating contents of processing of the controller provided to the radar apparatus.

Once a single sweep worth or an appropriate amount of the radar waves transmitted from the transmitter 110 are received (S210), the controller processes the reception data reflected on the target object (echo data). Specifically, from the reception data, the analyzing module 130 specifies amplitude data for each cell and stores them in the amplitude data sub-memory 133, and the analyzing module 130 specifies the speed data for each cell and stores them in the speed data sub-memory 134. Then, the analyzing module 130 performs the following analyzation and processing on these kinds of data.

The controller determines whether the amplitude of the observing cell 140 is a threshold or higher by referring to the amplitude data sub-memory 133 (S230). Then, the controller obtains the speed difference between the adjacent cells 141 and 142 for each observing cell 140 of which amplitude is the threshold or higher, by referring to the speed data sub-memory 134. Then, if the absolute value of the speed difference is the threshold or higher (S240), the controller performs the processing of adjusting the amplitude of the observing cell 140 in the amplitude data sub-memory 133 to zero (S250). The controller performs this processing to all the cells while shifting the observing cell 140 (S260).

Figure 7:
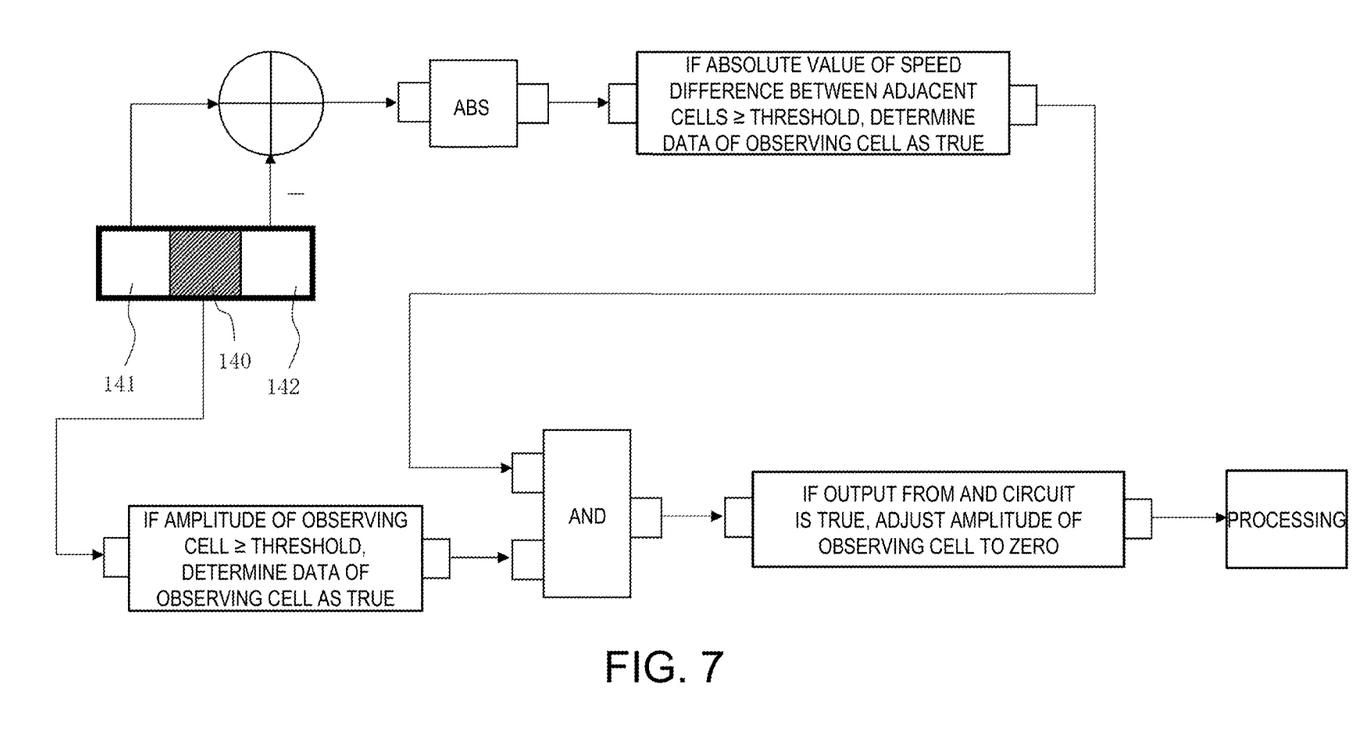
FIG. 7 is a block diagram illustrating specific contents of processing of an analyzing module according to the second embodiment of this disclosure.

FIG. 7 is a block diagram illustrating specific contents of processing of the analyzing module.

The analyzing module 130 calculates the speed difference between the adjacent cells 141 and 142 adjacent to the observing cell 140 by referring to the speed data sub-memory 134. If the absolute value of the speed difference between the adjacent cells 141 and 142 is the threshold or higher, the analyzing module 130 determines the data of the observing cell 140 as TRUE (first condition). Meanwhile, the analyzing module 130 determines whether the amplitude of the observing cell 140 is a threshold or higher by referring to the amplitude data sub-memory 133, and if the amplitude is the threshold or higher, the analyzing module 130 determines the data of the observing cell 140 as TRUE (second condition). When the first and second conditions for the observing cell 140 are satisfied, the analyzing module 130 performs the processing of adjusting the amplitude of the observing cell 140 of which data is determined as TRUE, to zero.

The physical significance in performing the above processing is as follows.

Specifically, if the speed difference between the cells adjacent to the observing cell is a certain value (threshold) or higher and the amplitude of the observing cell is the threshold or higher, the possibility of the respective adjacent cells indicating different target objects becomes high. Thus, in this case, it is effective, in enhancing the resolution, to adjust the amplitude of the observing cell to zero and separate the respective adjacent cells in the amplitude data sub-memory 133 (separate in the display data). Note that, the determination for the second condition may be performed only for the cell satisfying the first condition, or the determination for the first condition may be performed only for the cell satisfying the second condition. By such processing, the entire processing efficiency can be improved.

Next, a third embodiment of this disclosure is described.

Figure 8:
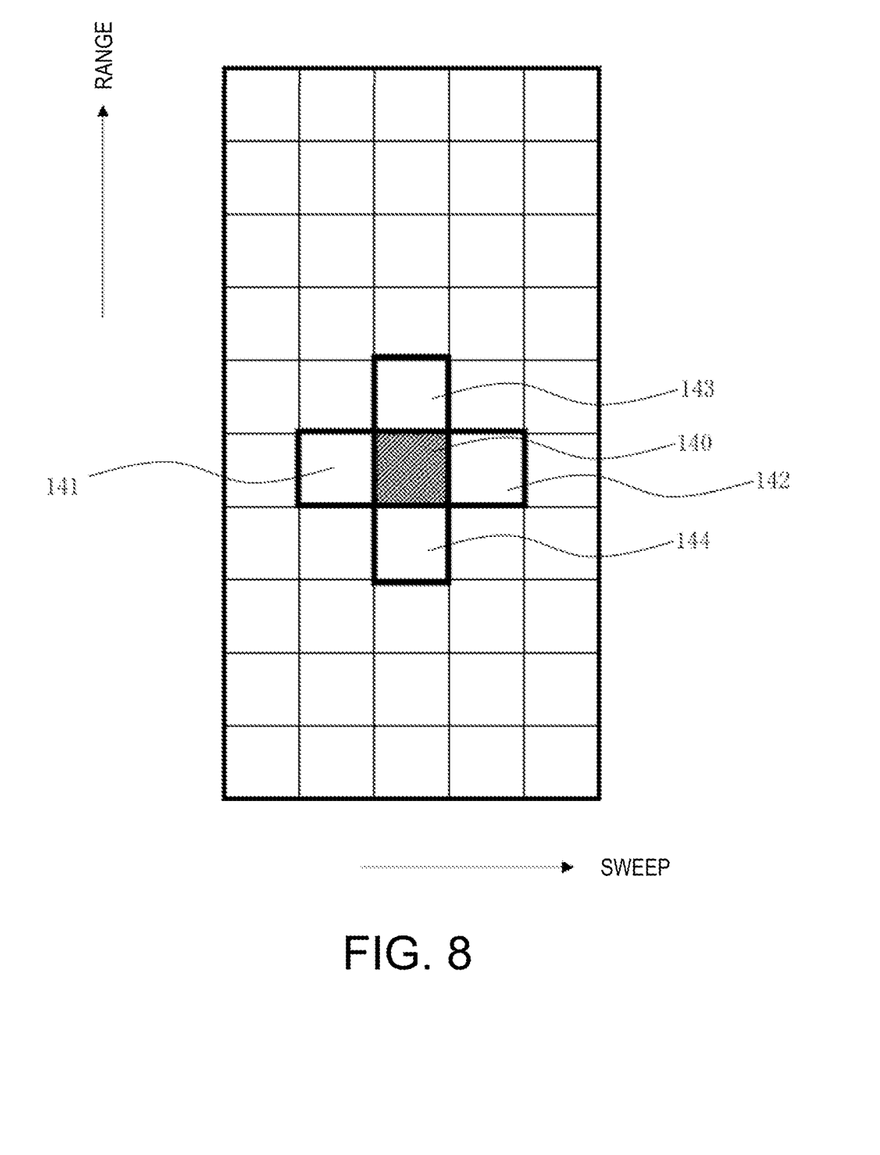
FIG. 8 is a view illustrating an observing cell and adjacent cells in a coordinate system according to a third embodiment of this disclosure.

FIG. 8 is a view illustrating the observing cell and the adjacent cells in the coordinate system.

The adjacent cells of this embodiment are cells adjacent to the observing cell 140 in a first direction and a second direction perpendicular to the first direction, centering on the observing cell 140. In this embodiment, the adjacent cells in the first direction are adjacent cells 141 and 142, and the adjacent cells in the second direction are adjacent cells 143 and 144.

Figure 9:
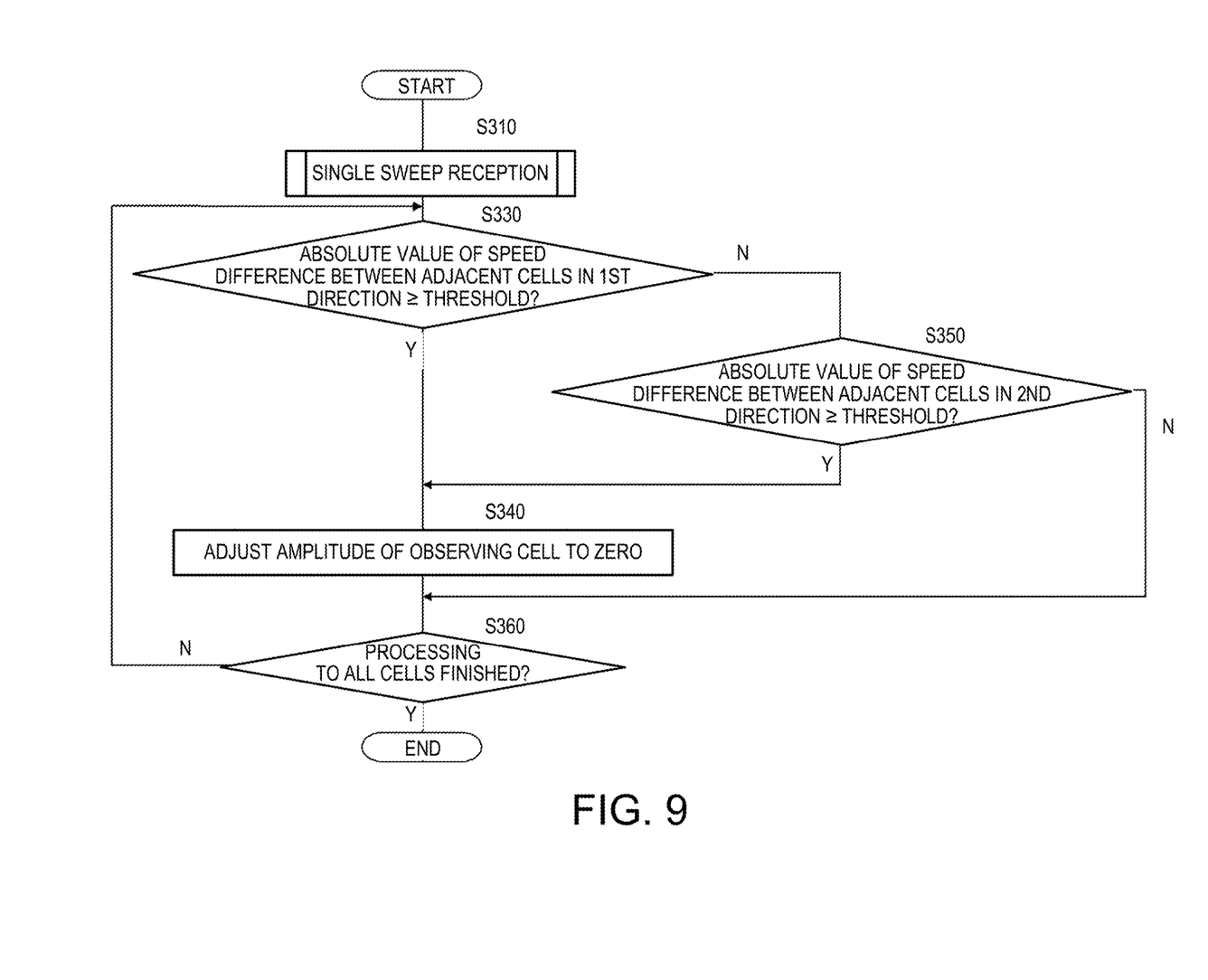
FIG. 9 is a flowchart illustrating contents of processing of a controller provided to a radar apparatus according to the third embodiment of this disclosure.

FIG. 9 is a flowchart illustrating contents of processing of the controller provided to the radar apparatus.

Once a single sweep worth or an appropriate amount of the radar waves transmitted from the transmitter 110 are received (S310), the controller processes the reception data reflected on the target object (echo data). Specifically, from the reception data, the analyzing module 130 specifies the amplitude data for each cell and stores them in the amplitude data sub-memory 133, and the analyzing module 130 specifies the speed data for each cell and stores them in the speed data sub-memory 134. Then, the analyzing module 130 performs the following analyzation and processing on these kinds of data.

The controller obtains the speed difference between the adjacent cells 141 and 142 in the first direction and a speed difference between the adjacent cells 143 and 144 in the second direction for each observing cell 140 by referring to the speed data sub-memory 134. Then, as long as the absolute value of one of the speed differences is a threshold or higher (S330, S350), the controller performs the processing of adjusting the amplitude of the observing cell 140 in the amplitude data sub-memory 133 to zero (S340). The controller performs this processing to all the cells while shifting the observing cell 140 (S360).

Figure 10:
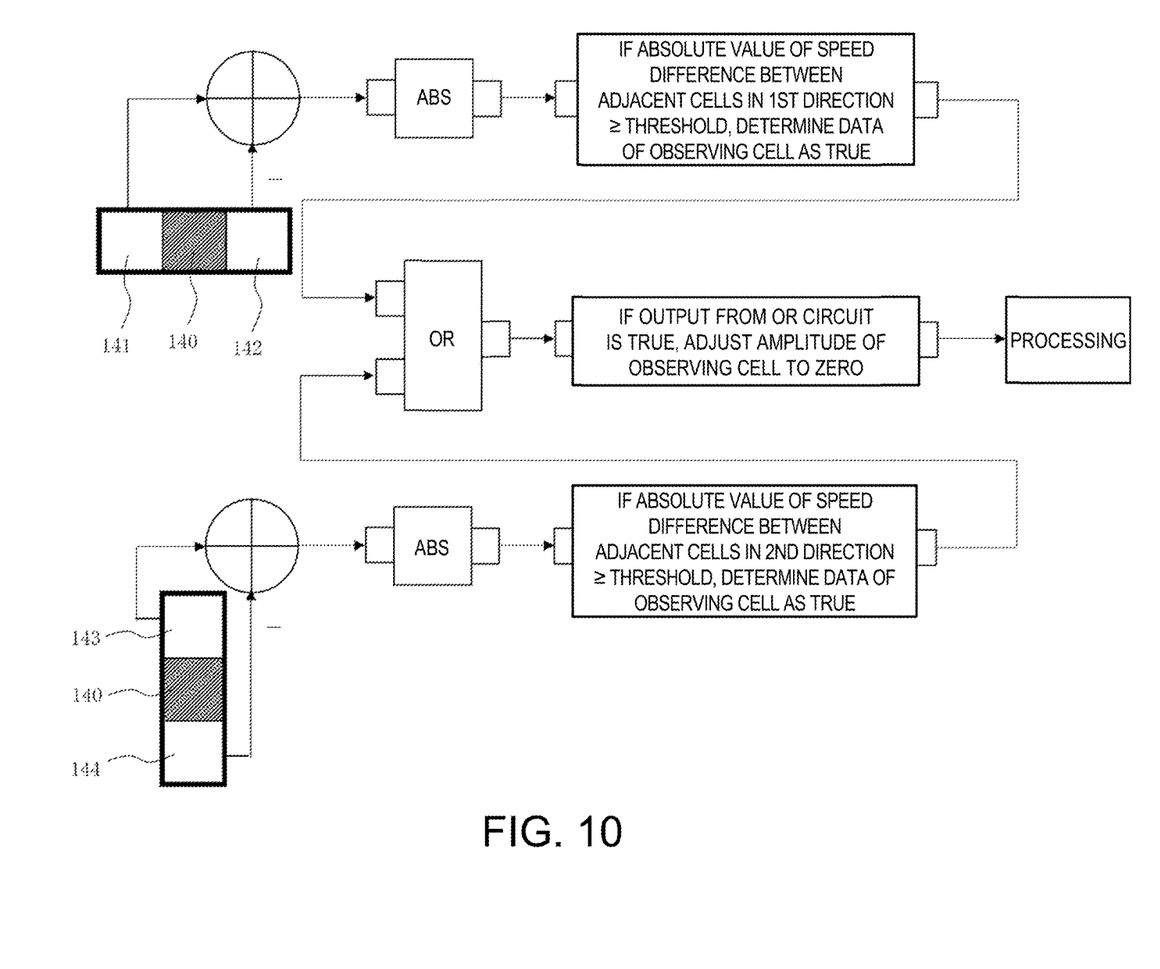
FIG. 10 is a block diagram illustrating contents of processing of an analyzing module according to the third embodiment of this disclosure.

FIG. 10 is a block diagram illustrating specific contents of processing of the analyzing module.

The analyzing module 130 calculates the speed difference between the adjacent cells 141 and 142 adjacent to the observing cell 140 in the first direction and the speed difference between the adjacent cells 143 and 144 adjacent to the observing cell 140 in the second direction, by referring to the speed data sub-memory 134. As long as the absolute value of one of the speed differences is the threshold or higher, the analyzing module 130 determines the data of the observing cell 140 as TRUE (first condition). If the first condition for the observing cell 140 is satisfied, the analyzing module 130 performs the processing of adjusting the amplitude of the observing cell 140 to zero.

The physical significance in performing the above processing is similar to the first embodiment of this disclosure. If the speed difference between the adjacent cells corresponding to each other in the sweep direction or the distance direction is the threshold or higher, since the adjacent cells are separated, the resolution can be enhanced even more.

Next, a fourth embodiment of this disclosure is described.

Figure 11:
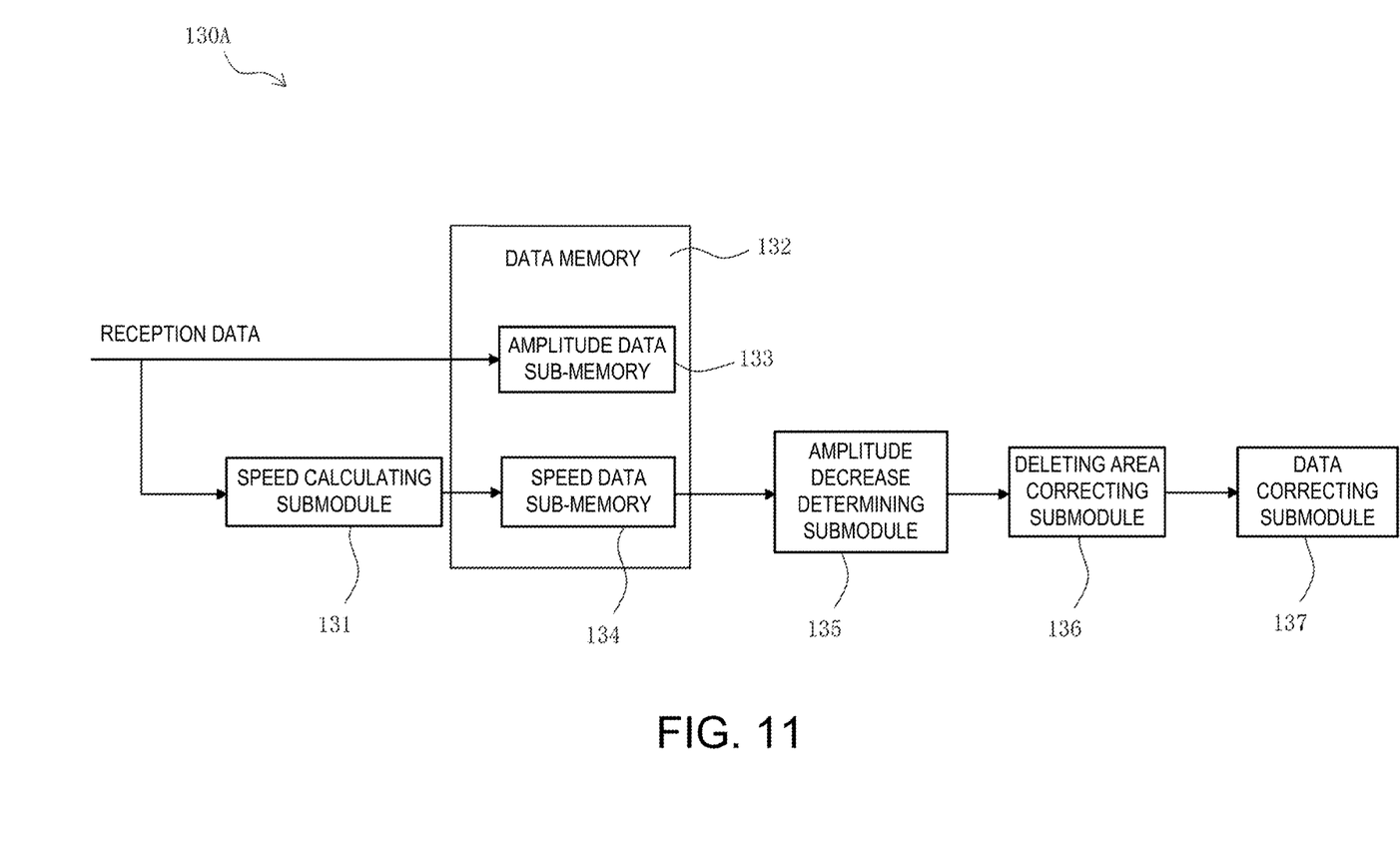
FIG. 11 is a block diagram illustrating a specific configuration of an analyzing module according to a fourth embodiment of this disclosure.
Figure 12:
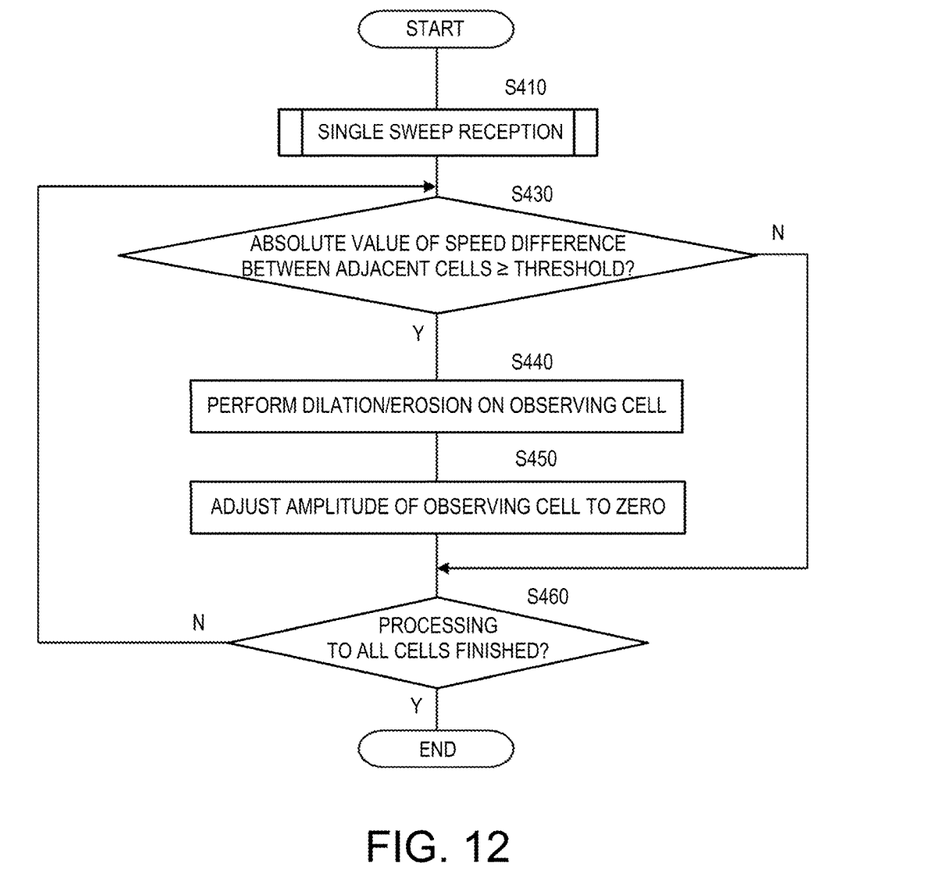
FIG. 12 is a flowchart illustrating contents of processing of a controller provided to a radar apparatus according to the fourth embodiment of this disclosure.

FIG. 11 is a block diagram illustrating a specific configuration of an analyzing module. FIG. 12 is a flowchart illustrating contents of processing of a controller provided to the radar apparatus.

The analyzing module 130A includes, in addition to the common configuration of the first to third embodiments, a deleting area correcting submodule 136 as shown in FIG. 11. The deleting area correcting submodule 136 performs dilation/erosion, which is frequently used in image processing, on each cell. FIG. 12 shows a process similar to FIG. 6, where radar waves transmitted from the transmitter 110 are received (S410). If the absolute value of the speed difference is the threshold or higher (S430), the deleting area correcting submodule 136 performs dilation/erosion on each cell (S440). When image data is binarized black and white image data, dilation means processing in which if even one of cells around an observing cell has a white pixel, the observing cell and the cells therearound are replaced with white data, and erosion means processing in which if even one of cells around an observing cell has a black pixel, the observing cell and the cells therearound are replaced with black data. When the image data has color gradations, for example, in the dilation, a maximum illuminance in the vicinity of the observing cell is replaced with the illuminance of the observing cell, and in the erosion, a minimum illuminance in the vicinity of the observing cell is replaced with the illuminance of the observing cell. By suitably performing such processing, noise is removed. Note that, if the throughput for image processing does not degrade, image processing other than the dilation and erosion may alternatively/additionally be performed to remove noise. After dilation/erosion is performed (S440), the controller performs processing of adjusting the amplitude of the observing cell 140 in the amplitude data sub-memory 133 to zero (S450). The controller performs this processing to all cells while shifting the observing cell 140 (S460).

In the above embodiments, the speed data of the target object is obtained from the reception data; however, acceleration data may be obtained alternative to the speed data, since the adjacent cells are considered to indicate different target objects also when the values of the acceleration data of the adjacent cells with respect to the observing cell are different from each other. In this case, in each of the above embodiments, the speed calculating submodule is replaced with an acceleration calculating submodule, and the speed data memory is replaced with an acceleration data memory.

Finally, the above embodiments are described as instantiation in all aspects, and therefore, it should not be interpreted in a limited way. The scope of this disclosure is defined by the claims, and not by the above embodiments. In addition, all of modifications and changes falling under the equivalent meaning and range of the claims are intended to be included in the scope of this disclosure.

DESCRIPTION OF REFERENCE NUMERALS

100 Radar Apparatus
110 Radar Wave Transmitter
120 Radar Wave Receiver
130 Analyzing Module
130A Analyzing Module
140 Observing Cell
141 Adjacent Cell
142 Adjacent Cell
143 Adjacent Cell
144 Adjacent Cell

What is claimed is:

1. A radar apparatus, comprising:
a radar wave transmitter configured to transmit radar waves at a predetermined time interval while revolving in an azimuth direction;
a radar wave receiver configured to receive the radar waves reflected on a target object;
processing circuitry configured to:
analyze data of the radar waves received by the radar wave receiver;
store one of a pair of amplitude data and speed data of the target object and a pair of the amplitude data and acceleration data of the target object for every cell of a predetermined coordinate system;
process, based on the pair of stored data, amplitude data of an observing cell of the predetermined coordinate system associated with one of speed and acceleration; and
output, as radar display data, the amplitude data of the observing cell of the predetermined coordinate system,
wherein the processing by the processing circuitry further comprises determining whether an absolute value of one of a speed difference and an acceleration difference between adjacent cells to the observing cell is equal to or higher than a threshold value, and reducing a value of the amplitude data of the observing cell if the absolute value is equal to or higher than the threshold value.

2. The radar apparatus of claim 1, wherein the processing by the processing circuitry further comprises reducing the value of the amplitude data of the observing cell by adjusting the value of the amplitude data to zero.

3. The radar apparatus of claim 2, wherein the processing by the processing circuitry further comprises determining when the value of the amplitude data of the observing cell is equal to or higher than the threshold value.

4. The radar apparatus of claim 3, wherein the adjacent cells are adjacent to the observing cell in a first direction and a second direction perpendicular to the first direction, centering on the observing cell.

5. The radar apparatus of claim 4, wherein after the analyzation, the processing circuitry is further configured to perform image processing on each cell, the image processing including one of dilation and erosion for image data.

6. The radar apparatus of claim 3, wherein after the analyzation, the processing circuitry is further configured to perform image processing on each cell, the image processing including one of dilation and erosion for image data.

7. The radar apparatus of claim 2, wherein the adjacent cells are adjacent to the observing cell in a first direction and a second direction perpendicular to the first direction, centering on the observing cell.

8. The radar apparatus of claim 7, wherein after the analyzation, the processing circuitry is further configured to perform image processing on each cell, the image processing including one of dilation and erosion for image data.

9. The radar apparatus of a claim 2, wherein after the analyzation, the processing circuitry is further configured to perform image processing on each cell, the image processing including one of dilation and erosion for image data.

10. The radar apparatus of claim 1, wherein the processing by the processing circuitry further comprises determining when the value of the amplitude data of the observing cell is equal to or higher than the threshold value.

11. The radar apparatus of claim 10, wherein the adjacent cells are adjacent to the observing cell in a first direction and a second direction perpendicular to the first direction, centering on the observing cell.

12. The radar apparatus of claim 11, wherein after the analyzation, the processing circuitry is further configured to perform image processing on each cell, the image processing including one of dilation and erosion for image data.

13. The radar apparatus of claim 10, wherein after the analyzation, the processing circuitry is further configured to perform image processing on each cell, the image processing including one of dilation and erosion for image data.

14. The radar apparatus of claim 1, wherein the adjacent cells are adjacent to the observing cell in a first direction and a second direction perpendicular to the first direction, centering on the observing cell.

15. The radar apparatus of claim 14, wherein after the analyzation, the processing circuitry is further configured to perform image processing on each cell, the image processing including one of dilation and erosion for image data.

16. The radar apparatus of claim 1, wherein after the analyzation of the data of the radar waves received by the radar wave receiver, the processing circuitry is further configured to perform image processing on each cell, the image processing including one of dilation and erosion for image data.

* * * * *